United States Patent Office 3,072,618
Patented Jan. 8, 1963

3,072,618
SULFONATION WITH ORGANIC PHOSPHOROUS COMPOUND-SULFUR TRIOXIDE ADDUCTS
Albin F. Turbak, New Providence, N.J., assignor to Esso Research and Engineering Company, a corporation of Delaware
No Drawing. Filed Apr. 1, 1959, Ser. No. 803,382
21 Claims. (Cl. 260—79.3)

The present invention is directed to the sulfonation of unsaturated substances such as olefins, aromatics, substituted aromatics, and polymers of alkenyl aromatic compounds. The invention specifically concerns a process for sulfonating unsaturated compounds and polymers in which phosphorus-containing compounds are employed to regulate the sulfonation reaction.

Heretofore, unsaturated compounds and alkenyl aromatic polymers, especially vinyl aromatic resins such as polystyrene, have been sulfonated with concentrated sulfuric acid, chlorosulfonic acid and sulfur trioxide; however, even the best commercial processes have some undesirable features. For instance, when sulfur trioxide is used to sulfonate unsaturated organic substances, e.g. alkenyl aromatic-containing polymers, it is necessary to employ low temperatures, i.e., below 0° C., and very short contact times in order to avoid undesirable side reactions, such as excessive cross-linking, and the excessive formation of color bodies.

Because sulfonated polymers are useful as aqueous thickeners, impregnants, adhesives, soil conditioners and textile-sizes, it is important to reduce the number of cross-linkages to the smallest possible number so that they will have even greater utilization in the aforementioned fields. Sulfonating processes which do not control the degree of cross-linking are unacceptable to the manufacturer whose customers require a product having a specified viscosity. A number of methods have been suggested which purportedly reduce the amount of sulfone cross-linking during the sulfonation and purification steps. However, these processes have not been altogether successful and most of them require the use of undesirably low temperatures and careful control in order to avoid undesirable side reactions.

It has now been discovered that the sulfonation of unsaturated substances such as olefins, aromatics and alkenyl aromatic-containing polymers can be easily controlled and regulated by the use of certain phosphorus compounds. When the phosphorus compounds to be described hereinafter are used in accordance with the present invention, they permit room temperature sulfonation as well as the preparation of cross-link free or substantially cross-link free products. The phosphorus compounds form a complex with available sulfur trioxide, and thus reduce the activity of the available sulfur trioxide and permit one to sulfonate under much less rigorous conditions than were heretofore necessary.

In carrying out the present invention, an unsaturated organic compound or an alkenyl aromatic-containing polymer, both of which are included in the term "organic substance" as used hereinafter, is sulfonated with a sulfonating agent comprising available sulfur trioxide in combination with a phosphorus compound which is either tri- or pentavalent. In a preferred embodiment, the phosphorus compound and available sulfur trioxide are contacted prior to admixing them with the organic substance to form a complex. However, it is not essential to premix the available sulfur trioxide with the phosphorus-containing compound, but rather it is only necessary to have the latter compound present during the sulfonating reaction. For instance, the available sulfur trioxide and phosphorus compound may be admixed simultaneously with the organic substance and the complex may be formed in situ in the sulfonating zone. Because the phosphorus compound affects the reactivity of the available sulfur trioxide, the sulfonation temperature need not be maintained below 0° C., but rather it may vary from as low as −40° C. to as high as 100° C. Moreover, the pressure is not a critical condition and may be adjusted to any satisfactory level. For instance, the sulfonation may be carried out from a reduced pressure of, say, about 0.5 atmosphere up to a superatmospheric pressure in the area of 10 atmospheres. The most suitable conditions from an economic standpoint are temperatures of 15° to 40° C. and pressures which are approximately atmospheric. The sulfonation time will, of course, vary with the particular conditions selected and the compound being sulfonated, although the reaction is generally complete within a few seconds to several hours after the reactants are contacted with each other. When sulfonating at approximately room temperature and atmospheric pressure, the contact time should be about 5 seconds to 25 or 30 minutes. Since the phosphorus compound reduces the activity of the sulfur trioxide, it is not necessary to limit the sulfonating time as is required in conventional processes. This is also true of the purification step where it may be desirable to leave the organic substance in contact with the sulfonating agent for several hours.

While the phosphorus compound may be either inorganic or organic, it is preferred to use an organic phosphorus compound containing either of the following functional groups:

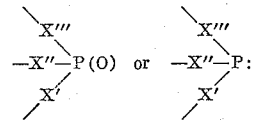

in which X′, X″ and X‴ are either oxygen or carbon and need not necessarily be the same, O is oxygen and P is phosphorus. For aromatic sulfonation, at least one of the "X" atoms must be oxygen. Various organic phosphite, phosphinite, phosphinate, phosphate, phosphonate, phosphonite and phosphine compounds may be employed to prepare the complexed product. The compounds may contain from 0 to 3 ester oxygens which may have alkyl, aryl, alkaryl or aralkyl groups attached to them containing 1 to 18 carbon atoms. Similar organic groups may be attached to the phosphorus directly as indicated above when "X" is carbon. These organic groups should be relatively nonreactive, especially with the available sulfur trioxide used to form the complex. If a reaction does occur between the sulfur trioxide and the organic group attached to the phosphorus, it will be necessary to use additional sulfur trioxide to compensate for this loss. Complexes containing inorganic acids such as phosphoric acid, phosphorous acid, pyrophosphoric acid, metaphosphoric acid, phosphonic acid and phosphinic acid are suitable as sulfonating agents. In addition to the acids their mono-, di- and tri-substituted derivatives may also be employed. However, the preferred phosphorus compounds are the trialkyl phosphates and phosphites.

Among the organic phosphorus compounds which may be employed to prepare the complexes are: triethyl phosphate, trimethyl phosphate, tripropyl phosphite, tri-butyl phosphate, triethyl phosphite, trimethyl phosphite, tri-propyl phosphite, tri-butyl phosphite, diethyl hydrogen phosphate, dimethyl hydrogen phosphate, diethyl hydrogen phosphite, dimethyl hydrogen phosphite, ethyl dihydrogen phosphate, methyl dihydrogen phosphate, ethyl dihydrogen phosphite, methyl dihydrogen phosphite, tris (2,4-dichlorophenyl) phosphate, tris (2,4-dichlorophenyl) phosphite, bis (2,4-dichlorophenyl) hydrogen phosphate, bis (2,4-dichlorophenyl) hydrogen phosphite, tris (p-nitrophenyl) phosphate, tris (p-nitrophenyl) phosphite, bis (p-nitrophenyl) hydrogen phosphate, bis (p-nitrophenyl) hydrogen phosphite, tris (p-sulfophenyl) phosphate, tris (p-sulfophenyl) phosphite, 2,4-dichlorophenyl dihydrogen phosphate, 2,4-dichlorophenyl dihydrogen phosphite, tetraethyl pyrophosphate, tetramethyl pyrophosphate, dimethyl diethyl pyrophosphate, ethyl metaphosphate, bis (2,4-dichlorophenyl) diethyl pyrophosphate, sym-p-nitrophenyl pyrophosphate, p-nitrophenyl metaphosphate, tris (B-chloroethyl) phosphate, tetra (B-chloroethyl) pyrophosphate, diethyl dihydrogen pyrophosphate, di (2,4 dichlorophenyl) dihydrogen pyrophosphate, tris (2,4,6-trimethylphenyl) phosphate and tris (3,4,6-trimethylbenzyl) phosphate. Where pyrophosphates are employed, as many as 12 moles of available sulfur trioxide may be complexed with each mole of phosphorus compound.

The $C_2$ to $C_{30}$ olefins which may be sulfonated in accordance with this invention are monoolefins of the type

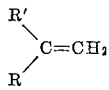

and diolefins of the type

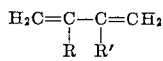

wherein R and R' may be hydrogen, methyl, ethyl, isopropyl, or any cyclic or acyclic aliphatic group containing 1 to 18 carbon atoms. Examples of typical compounds are ethylene, propylene, butene-1, isobutylene, octene, octadecene, butadiene, isoprene, 2,3-dimethyl butadiene and vinyl cyclohexane. The diolefins may react at both double bond positions to yield dihydroxy disulfonates.

The aromatic and substituted aromatic compounds which may be sulfonated in accordance with the present invention contain 6 to 30 carbon atoms, at least one of which is reactive towards the sulfonating complex. Suitable aromatic and substituted aromatic compounds include benzene, toluene, xylene, durene, isodurene, ethyl benzene, methylethyl benzene, cumene, chlorobenzene, bromobenzene, naphthalene, phenanthrene, naphthalene sulfonic acid, 2,5-dichlorotoluene, benzene alkylates of the type produced by alkylation with tetrapropylene, nonyl benzene, p-2-ethyl hexyl toluene, abietic acid, anisole, N-N-dimethyl aniline, 1-ethoxy naphthalene, 2-methyl phenanthrene, lignin and vanillin. In general, the sulfonated aromatic and substituted aromatic compounds which are most suitable for commercial use contain 1 benzene ring and, in many instances, have at least 1 hydrocarbon substituent, e.g. benzene alkylate.

The alkenyl aromatic-containing polymers which may be sulfonated in accordance with the invention should be at least dimers or pentamers and may contain up to 50,000 or 100,000 monomer units or more per chain. While the polymer should contain a substantial number of alkenyl aromatic units, it is not necessary that they be homopolymers. Thus, various copolymers and ter-polymers containing up to 50 or 90% of a nonaromatic monomer unit may also be sulfonated in accordance with this process. For instance, copolymers of from 70 to 98% styrene and from 30 to 2% acrylonitrile may be used. Other suitable copolymers include copolymers of from 65 to 98% vinyl toluene and from 35 to 2% acrylonitrile, copolymers of styrene, vinyl toluene and from 2 to 35% acrylonitrile, copolymers of from 60 to 75% alphamethyl styrene, 20 to 25% acrylonitrile and 5 to 10% ethyl methacrylate, copolymers of styrene and sulfur dioxide, copolymers of from 68 to 95% of either or both of the compounds styrene and vinyl toluene and from 5 to 32% of maleic anhydride, copolymers of from 60 to 87% of either or both of the compounds styrene and vinyl toluene and from 13 to 40% of ethyl methacrylate, the copolymer of 75% styrene and 25% ethyl acrylate, copolymers of 5 to 30% styrene and 70 to 95% butadiene-1,3, etc.

The alkenyl aryl group in the polymer may consist wholly of hydrogen and carbon atoms or it may be substituted with other atoms, such as halogen atoms, or groups which are less ractive to sulfur trioxide than the aromatic ring in the alkenyl aryl group. A generic formula for the alkenyl aromatic unit is as follows:

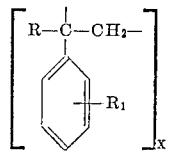

in which R is an alkyl, aryl, alkaryl, halogen, or hydrogen, said alkyl, aryl or alkaryl group containing from 1 to 8 carbon atoms, and $R_1$ is an alkyl, aryl, alkaryl, hydrogen or any substituent having a Hammett Sigma value of $-1.50$ to $+1.50$ inclusive and which is less reactive with sulfur trioxide than the aromatic ring under the conditions of sulfonation.

The viscosity of the polymer prior to sulfonation may vary from 1 to 3000 centipoises at 25° C. as measured by the Brookfield viscosimeter fitted with an ultra low shear rate adapter. For instance, polystyrene may be dissolved in dichloroethane to make a 2.1 wt. percent solution which is then measured with a Brookfield viscosimeter as already mentioned. Depending upon the molecular weight of the polystyrene, it will have a viscosity ranging from about 5 to 2000 centipoises. Other alkenyl aromatic-containing polymers having comparable viscosities or molecular weights may also be sulfonated according to the process of the present invention.

By the term "available sulfur trioxide" is meant not only sulfur trioxide itself but also those substances which contain sulfur trioxide in a loosely bound form from which it can be readily liberated when treated with the phosphorus compound. Fuming sulphuric acid ("oleum," 20–80%) and chlorosulphonic acid are examples of products of the latter type which will form compounds with the phosphorus compound similar to that formed by sulfur trioxide but differing from that formed by ordinary sulphuric acid, and which act like sulfur trioxide-phosphorus complexes in sulfonation reactions. For the purposes of the present invention, compounds containing sulfur trioxide in loosely bound form may be considered equivalents of sulfur trioxide although the products may differ in some respect.

In a preferred embodiment, the available sulfur trioxide is admixed with the phosphorus compound in the presence or absence of an inert solvent, such as a chlorinated hydrocarbon, at a temperature of −30 to about 100° C. Since the available sulfur trioxide and phosphorus-containing compound react exothermally to form a complex, it is best to have a substantial amount of an inert organic diluent present to assist in the dissipation of the heat of reaction. Suitable solvents include such things as carbon tetrachloride, chloroform, dichloroethane, methylene chloride and other inert halogen-containing hydrocarbon compounds. Other nonhalogen-containing solvents may be used. Any solvent which will dissolve the unsaturated compound (olefin, aromatic, or polymer) and the sulfur trioxide-phosphorus complex and be unreactive with the complex is considered a suitable solvent. A satisfactory method for forming the complex involves dissolving the phosphorus compound in a solvent to form a 1 to 50 wt. percent solution, preferably a 2 to 10 wt. percent solution, and adding the available sulfur trioxide to this solution with agitation. The reaction is complete within a few seconds after all of the sulfonating agent has been added when the temperature of the reaction mixture is about 20 to 50° C., a longer period of time is required when the reaction mixture is maintained below 20° C. The pressure in the reaction zone is not critical and may be varied according to the desires of the manufacturer. For instance, a superatmospheric pressure of, say, up to 10 atmospheres or more may be employed where low boiling solvents are used, or the pressure may be reduced if this is thought necessary. However, it will generally be found that atmospheric pressure is quite suitable for carrying out the reaction.

The amount of available sulfur trioxide contacted with the phosphorus compound to form the sulfonating agent will of course vary according to the particular phosphorus compound used to control the activity of the sulfonating substance. It has been found that the molar relationship between the phosphorus compound and available sulfur trioxide should be between 1:1 and 1:12 inclusive for phosphate compounds, preferably between 1:1 and 1:4. For pyrophosphate structures the ratio should be between 1:2 and 1:12 depending on the reactivity desired. For reaction with olefins, the lower ratios (e.g. about 1:1) are satisfactory, while for sulfonation of an aromatic nucleus either in monomeric or polymeric substances, it is desirable to have more than an equimolar relationship between the available sulfur trioxide and phosphorus compound, i.e. the mole ratio of phosphorus compound to available sulfur trioxide should be at least 1:2. The initial sulfur trioxide molecule generally attaches itself to the electron pair in the trivalent phosphorus compounds or the phosphoryl oxygen in the pentavalent phosphorus compound. Because this molecule of sulfur trioxide is strongly attached to the phosphorus compound, it will not sulfonate an aromatic nucleus. This is not the case with olefin compounds where it has been found that complexes made by reacting 1 mole of available sulfur trioxide with 1 mole of phosphorus compound are sufficiently reactive to sulfonate them. When sulfonating olefins, a sufficient amount of complex should be used to introduce two $SO_3$ groups into each olefinic bond in the molecule to give a cyclic intermediate which on water hydrolysis gives a hydroxy sulfonate product. For instance, 2 moles of a 1:1 sulfur trioxide-triethyl phosphate complex may be used to sulfonate the vinyl group in styrene and leave the aromatic ring intact. The foregoing reaction shows how the complex can be used to regulate the sulfonation of a compound which is both aromatic and olefinic.

With regard to the sulfonation of aromatic substances, the sulfonating or accessible sulfur trioxide molecules in the complex are coordinated with the ester oxygens in the phosphorus compound (aryloxy or alkoxy oxygen atoms). Thus, more than 1 mole of available trioxide should be reacted with each mole of phosphorus compound so that there will be a sufficient amount of accessible sulfur trioxide in the complex to sulfonate the aromatic substances. Therefore, to be an effective sulfonating agent for aromatic substances there should be at least one accessible sulfur trioxide molecule coordinated with one ester oxygen in the phosphorus compound, but there should be no more than two sulfur trioxide molecules coordinated with each ester oxygen in the phosphorus compound. Of course, it is not necessary to exclusively sulfonate with the sulfur trioxide molecules coordinating with the ester oxygens in the phosphorus compound, but rather a substantial excess of sulfur trioxide over and above that which will coordinate with the ester oxygens in the phosphorus compound may also be used, that is to say, up to 20 moles of available sulfur trioxide may be used for each mole of phosphorus compound. In this embodiment of the present invention, the phosphorus compound exerts a restrictive action on the sulfonating agent which varies with the amount of excess available sulfur trioxide employed.

To obtain a water soluble alkenyl aromatic-containing polymer, at least a majority of the aryl groups in the polymer molecule should be sulfonated, and preferably 60 to 70% of the aforementioned groups should be sulfonated with 1 to 2 molecules of available sulfur trioxide, that is to say, that one mole of polymer should be sulfonated with at least ⅔ mole of accessible sulfur trioxide but not more than about 3 moles. The preferred molar relationship between the aromatic compound or polymer and the accessible sulfur trioxide in the sulfonating agent is between 1:1 and 1:2.5 inclusive. The aromatic compound or polymer, which may be dissolved in the same solvent used to prepare the complex or one which is compatible with that solvent, is contacted with the complex containing available sulfonating agent under the conditions already described. For most purposes, it has been found suitable to use a solution containing from about 1 to 30 wt. percent polymer or 1 to 100 wt. percent aromatic compound.

The sulfonated alkenyl aromatic-containing polymer will precipitate out of solution when dichloroethane is employed. The precipitate may be separated by filtering according to known techniques and washing the precipitate with pure solvent, or it may be separated from the liquid by centrifuging the reaction mixture and decanting the supernatant liquid from the precipitate. The precipitate may be washed with pure solvent and the precipitant-containing solution centrifuged to separate the precipitate from the washed solution. Regardless of how the sulfonated polymer is recovered and purified, it may be dried in a hot air or vacuum oven at a temperature less than 100° C., e.g. 50 to 70° C. Still another method for recovering the sulfonated polymer involves dissolving the precipitate in an alcohol such as methyl alcohol and adding sufficient alkali, e.g. 50 wt. percent solution of sodium hydroxide to the sulfonated polymer to make a substantially neutral alkali metal salt. The salt may then be separated from the liquid by centrifuging and decanting the supernatant liquid from the precipitate. Because the sulfonated polymers contain substantially no cross-linking, both the acid and salt are soluble in room temperature water up to about 50 or 60 wt. percent, depending upon the molecular weight of the sulfonated polymer. By employing sulfonating temperatures below about 40° C., it is possible to produce sulfonated polymers which are completely free of sulfone cross-linking. The high molecular weight sulfonated poly aromatic polymers, especially those having 10,000 or more monomer units per molecule, are particularly useful as water thickeners. These polymers contain from 1 to 18 wt. percent combined sulfur and contain no detectable cross-linking.

The following examples will illustrate the practice of the present invention.

EXAMPLE 1

6.1 grams of triethyl phosphate (0.0333 mole) was dissolved in 200 cc. of dichloroethane at room temperature. To the phosphate solution was added 4.16 cc. of sulfur trioxide (0.1 mole) over a period of 2 minutes with sufficient stirring to bring the sulfur trioxide into intimate contact with the phosphate. It was noted that as the sulfur trioxide was added to the phosphate solution, the temperature rose to about 36° C. and while the mixture was being stirred for an additional 5 minutes the temperature dropped to about 30° C. Thereafter the phosphate-sulfur trioxide complex formed was chilled to −5° C. and a 2.1 wt. percent solution of polystyrene (5 grams) in dichloroethane (viscosity at 25° C. was 2000 centipoises) was flowed into the sulfur trioxide-phosphate complex solution with stirring and the temperature of the mixture was maintained at −5° C. by cooling. After the polymer had been added over a period of 3 minutes, the resulting mixture was stirred for an additional 10 minutes. The sulfonated polymer precipitated out as it contacted the sulfonating complex. The precipitate was radiply filtered from the liquor and quenched in about 750 cc. of methanol. Phenolphthalein (3 cc.) was added to the methanol solution and a sufficient amount of 50 wt. percent sodium hydroxide solution was added dropwise to produce a permanent red color. The sodium salt of the sulfonated polystyrene was then filtered and dried in a vacuum oven at 65° C. and 200 mm. of mercury absolute pressure for about 18 hours.

EXAMPLE 2

Example 1 was repeated except that the molar ratio of phosphate to sulfur trioxide was in one run 1:7 instead of 1:3. Table I shows the effect of varying the phosphate-sulfur trioxide molar ratio on the behavior of the sodium salt of sulfonated polystyrene in salt water.

*Table I*

| Phosphate/Sulfur Trioxide | Concentration of Sulfonated Polymer in Salt Water | Viscosity in Salt Water at 60° C. (Brookfield Model LVT —30 r.p.m.) | pH |
|---|---|---|---|
| Sulfur Trioxide only | Insoluble | Too badly cross-linked to dissolve. | |
| 1/3 Moles | 0.2 wt. percent | 13.2 cp | 9.0 |
| 1/7 Moles | 0.2 wt. percent | 11.3 cp | 8.5 |

The data demonstrate that using the phosphorus-containing complex of the present invention makes it possible to sulfonate an alkenyl aromatic polymer without introducing any substantial number of cross-links during the sulfonation. The absence of cross-linkages is shown by the low viscosity of the sulfonated polymer at 60° C. It should be noted that the control was severely cross-linked.

EXAMPLE 3

The complex prepared in Example 1 was used to sulfonate polyvinyl toluene having a viscosity of 160 poises at 25° C. (2.1 wt. percent solution in dichloroethane). The sulfonation conditions were identical with that employed in the aforementioned example. The sodium salt of the product was dissolved in salt water to produce a 0.25 wt. percent solution which had a viscosity of 4.4 centipoises at 60° C. (Brookfield Model LVT–30 r.p.m.-U.L. adapter) at pH 10.3.

EXAMPLE 4

Polystyrene having a viscosity of 11.48 centipoises at 25° C. (2.1 wt. percent solution in dichloroethane) was sulfonated with a triethyl phosphate-sulfur trioxide complex prepared according to the procedure described in Example 1 except that varying amounts of sulfur trioxide were reacted with 1 mole of triethyl phosphate. 2.1 moles of sulfur trioxide were reacted with each mole of polystyrene at —20° C. for 10 minutes. The effect of the various complexes prepared on the viscosity of the sodium salt of the sulfonated polystyrene in the distilled water is shown in Table II. It should be noted that even with this relatively low molecular weight polystyrene and the very low temperature of sulfonation (—20° C.), the uncomplexed $SO_3$ still cross-linked the polymer very badly.

*Table II*

| Run No. | Triethyl Phosphate/Sulfur Trioxide | Concentration in Distilled Water, Wt. Percent | pH | Viscosity, at 60° C., cp. (Brookfield Model LVT —UL Adapter, 0.3 r.p.m.) |
|---|---|---|---|---|
| 1 | Sulfur trioxide only | 1.13 | 5.9 | 332 |
| 2 | 1/1 Mole [1] | Water Insoluble Product | | |
| 3 | 1/2 Moles | 1.91 | 7.6 | 6.0 |
| 4 | 1/3 Moles | 1.85 | 7.5 | 8.0 |
| 5 | 1/4 Moles | 1.48 | 6.0 | 8.0 |

[1] The 1/1 complex did not sulfonate the aromatic nucleus at —20° C. The product isolated was water insoluble.

In run No. 3, in which the complex was made with 1 mole of triethyl phosphate and 2 moles of sulfur trioxide, it required 2 hours to filter the sulfonated polymer free of the sulfonating liquor at room temperature. In spite of this long exposure to the sulfonating liquid, the polymer did not gel and its sodium salt had a low viscosity in distilled water. The viscosity data in Table II show that varying amounts of complex may be used to control the sulfonation of aryl-containing polymers and avoid the formation of cross-linkages in the polymer product.

EXAMPLE 5

Example 1 was repeated with a polystyrene having a viscosity of 7 centipoises at 25° C. when dissolved in dichloroethane to make a 2.1 wt. percent solution. The time and temperature of the sulfonation reaction are shown in Table III as well as the viscosity of a 1 wt. percent solution of the sodium salt of the sulfonated polymer at pH 10.

*Table III*

| | Sulfonation Conditions (2.1 Moles $SO_3$/1 Mole Polymer) | | Viscosity in Distilled Water, cp. [a] |
|---|---|---|---|
| | Time, Min. | Temp., ° C. | |
| 1/3 Moles | 10 | —20 | 4 |
| Do | 10 | 15 | 22 |
| Do | 30 | 25 | 38 |
| Do | 60 | 32 | 36 |
| Sulfur Trioxide only | 10 | —20 | 500 |
| Do | 10 | 15 | 1,588 |

[a] Brookfield viscosimeter, Model LVT, U.L. adapter, 0.3 r.p.m., 60° C.

The results in Table III show that alkenyl aromatic polymers can be sulfonated with sulfur trioxide-phosphorus complexes at temperatures substantially above room temperature for long periods of time without producing any appreciable amount of cross-linking in the polymer. When the viscosities of the products sulfonated with the complex are compared with the products obtained with sulfur trioxide alone, it is apparent that the complex is outstandingly effective in preventing cross-linking.

EXAMPLE 6

Example 1 was repeated except that the polymer was a copolymer of 60% styrene and 40% isobutylene having an intrinsic viscosity of 0.87 and the polymer solution added to the complex contained 6.79 grams instead of 5 grams of polymer. The sulfonated copolymer was substantially cross-link free.

EXAMPLE 7

A sulfonating agent was prepared by mixing 39.3 grams of triethyl phosphate dissolved in 200 cc. of dichloroethane with 9.0 cc. of sulfur trioxide. The temperature of the mixture rose from 25° C. to about 35° C. and thereafter the temperature slowly dropped until the reaction mixture returned to room temperature. To the complex thus formed was added 25.2 grams (0.1 mole) of octadecene-1 and the temperature was maintained at 25° C. for 10 minutes with stirring. The reaction mixture was allowed to stand at room temperature for 15 minutes and thereafter it was poured over 50 grams of ice in a 1 liter beaker and neutralized with 40 wt. percent sodium hydroxide. The dichloroethane solvent was evaporated from the neutralized product on a steam bath while a stream of nitrogen was bubbled through the liquid. 300 cc. of isopropyl alcohol was added to the stripped product and sufficient water was then added to bring the total volume to 600 cc. The mixture was then warmed at 40 to 60° C. and dehydrated by adding an excess of sodium sulfate to the liquid. The liquid mixture was then permitted to stand until two distinct layers appeared. The upper alcohol layer was siphoned off and to it was added sufficient water to bring the total volume to 600 cc. The mixture was then extracted three times with petroleum ether, the ether extracts were evaporated and 6 grams of residue were recovered. The extracted alcohol-water mixture was made slightly acidic with sulfuric acid, warmed to 40 to 60° C. and mixed with an excess of anhydrous sodium carbonate. Upon cooling two separate layers appeared, the upper alcohol layer of which was siphoned off. Additional alcohol was added to the alcohol layer to bring the concentration of alcohol to 87 vol. percent. The liquid was then cooled and a slight excess of anhydrous sodium carbonate was added to the alcoholic solution. The solution was filtered and the filtrate was evaporated on a steam bath until a thick syrupy substance was obtained. This was dried in a vacuum desiccator. The product contained 8.5% sulfur (theoretical is 9.3%) and 1.38% phosphorus.

EXAMPLE 8

Example 7 was repeated except that the complex contained triethyl phosphate and sulfur trioxide in a molar ratio of 1:3 instead of 1:1. The product obtained was similar to that gotten in Example 7 except it had a darker color which indicates that the higher amount of sulfur trioxide in the complex is not as desirable for the sulfonation of olefins as it is for the sulfonation of aromatic compounds and polymers.

EXAMPLE 9

A sulfonating agent made with 0.033 mole of triethyl phosphite and 0.1 mole of chlorosulfonic acid is contacted with 0.1 mole of ethyl benzene in 250 cc. of dichloroethane. The sulfonation is carried out at 25° C. for 10 minutes with stirring and the sulfonated substituted aromatic is isolated by forming the calcium salt of the acid.

EXAMPLE 10

Example 9 is repeated except that 0.033 mole of dimethyl hydrogen phosphite is used in place of triethyl phosphite to make the sulfonating agent.

EXAMPLE 11

A sulfonating agent made with 0.033 mole of tetrabutyl pyrophosphate and 0.198 mole of sulfur trioxide is contacted with 0.1 mole of ethylbenzene in 250 cc. of dichloroethane. The sulfonation is carried out at 25° C. for 10 minutes with stirring and the sulfonated substituted aromatic is isolated by forming the calcium salts of the acid.

It is not intended that the foregoing examples should in any way limit the invention since they are given to specifically demonstrate how the invention may be practiced.

What is claimed is:

1. Process for sulfonating a $C_6$ to $C_{30}$ aromatic compound comprising contacting said compound with a sulfonating complex at 0 to 100° C. for from a few seconds to several hours, said sulfonating complex comprising the reaction product of about 2 to 4 moles of sulfur trioxide and 1 mole of a lower trialkyl phosphate and recovering a sulfonated aromatic compound.

2. Process according to claim 1 in which the aromatic compound contains 1 benzene ring.

3. Process according to claim 1 in which the aromatic compound is a benzene alkylate.

4. Process for sulfonating a $C_2$ to $C_{30}$ olefin comprising contacting said olefin with a sulfonating complex at 0 to 100° C. for from a few seconds to several hours, said sulfonating complex comprising the reaction product of about 1 to 2 moles of sulfur trioxide and 1 mole of a lower trialkyl phosphate and recovering a sulfonated olefin.

5. Process according to claim 4 in which the mole ratio of sulfur trioxide in said sulfonating complex to olefin is about 1:1.

6. Process for sulfonating a polymer made from an alkaryl aromatic compound comprising contacting said polymer with a sulfonating complex at −40 to 100° C. for from a few seconds to several hours, said sulfonating complex comprising the reaction product of about 2 to 4 moles of available sulfur trioxide and 1 mole of a lower trialkyl phosphate and recovering a sulfonated polymer.

7. Process according to claim 6 in which the alkenyl aromatic is a vinyl substituted aromatic.

8. Process according to claim 6 in which the polymer is polystyrene.

9. Process according to claim 6 in which the polymer is polyvinyl toluene.

10. Process according to claim 6 in which the polymer is a copolymer of styrene and isobutylene.

11. Process according to claim 1 in which the trialkyl phosphate is triethyl phosphate.

12. Process according to claim 4 in which the trialkyl phosphate is triethyl phosphate.

13. Process according to claim 6 in which the trialkyl phosphate is triethyl phosphate.

14. Process for sulfonating substantially cross-link-free polystyrene which comprises reacting said polystyrene dissolved in dichloroethane with a sulfonating complex at a temperature below about 40° C., said sulfonating complex consisting of the product formed by reacting sulfur trioxide with triethyl phosphate in a mole ratio of about 3:1 at temperatures of about 20° to 50° C., and recovering a sulfonated polystyrene product that is substantially free of cross-linkages.

15. Process for sulfonating an unsaturated organic compound selected from the group consisting of olefins and aromatic compounds comprising admixing 1 to about 12 moles of sulfur trioxide derived from a substance selected from the group consisting of fuming sulfuric acid, chlorosulfonic acid and sulfur trioxide with 1 mole of trialkyl phosphate in an inert solvent, contacting the resulting mixture with said unsaturated organic compound at a temperature of −40 to 100° C. under a pressure of about 0.5 to 10 atmospheres for from a few seconds to several hours and recovering a sulfonated organic compound.

16. Process for sulfonating an unsaturated organic compound selected from the group consisting of olefins and aromatic compounds comprising admixing 1 to about 12 moles of sulfur trioxide derived from a substance selected from the group consisting of fuming sulfur acid, chlorosulfonic acid and sulfur trioxide with 1 mole of triethyl phosphate in an inert solvent, contacting the resulting mixture with said unsaturated organic compound at a temperature of −40 to 100° C. under a pressure of about 0.5 to 10 atmospheres for from a few seconds to several hours and recovering a sulfonated organic compound.

17. Process for sulfonating unsaturated compounds which comprises contacting a sulfonatable unsaturated compound consisting wholly of carbon and hydrogen atoms with an agent comprising available sulfur trioxide and an organic phosphorus compound at about −40 to 100° C., said organic phosphorus compound being selected from the group consisting of compounds having the following structural formulae:

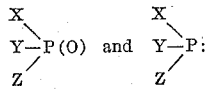

in which X, Y and Z are selected from the group consisting of $C_1$ to $C_{18}$ alkoxy, aryloxy, alkyl, aryl and alkaryl radicals, wherein the organic phosphorus compound in said agent is complexed with the available sulfur trioxide in a mole ratio of about 1:1 to 12 and at least some of the complexed available sulfur trioxide is capable of sulfonating said unsaturated organic compound.

18. Process for sulfonating unsaturated compounds which comprises reacting a sulfonatable unsaturated organic compound selected from the group consisting of olefins and aromatic compounds with an agent comprising sulfur trioxide and an organic phosphorus compound at about −40 to 100° C., said organic phosphorus compound being selected from the group consisting of compounds having the following structural formulae:

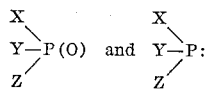

in which X, Y, and Z are selected from the group consisting of $C_1$ to $C_{18}$ alkoxy, aryloxy, alkyl, aryl and alkaryl radicals, wherein the organic phosphorus compound in said agent is complexed with sulfur trioxide in a mole ratio of about 1:1 to 12 and at least some of the complexed sulfur trioxide is capable of sulfonating said unsaturated organic compound.

19. In a process for sulfonating an unsaturated sulfonatable compound selected from the group consisting of olefins and aromatic compounds with sulfur trioxide at —40 to 100° C., the improvement which comprises using sulfur trioxide in the form of a complex comprising sulfur trioxide and an organic phosphorus compound selected from the group consisting of compounds having the following structural formulae:

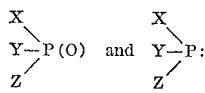

in which X, Y and Z are selected from the group consisting of $C_1$ to $C_{18}$ alkoxy, aryloxy, alkyl, aryl and alkaryl radicals, wherein the mole ratio of organic phosphorus compound to sulfur trioxide in the complex is about 1:1 to 7 and at least some of the complexed sulfur trioxide is capable of sulfonating said unsaturated compound.

20. In a process for sulfonating a polymer made from an alkenyl aromatic compound with sulfur trioxide at temperatures below about 40° C., the improvement which comprises using sulfur trioxide in the form of a complex consisting of sulfur trioxide and an organic phosphorus compound selected from the group consisting of compounds having the following structural formulae:

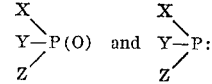

in which X, Y and Z are selected from the group consisting of $C_1$ to $C_{18}$ alkoxy, aryloxy, alkyl, aryl and alkaryl radicals, wherein the mole ratio of said organic phosphorus compound to sulfur trioxide in the complex is about 1:1 to 12 and at least some of the complexed sulfur trioxide is capable of sulfonating said polymer.

21. In a process for sulfonating an unsaturated sulfonatable compound selected from the group consisting of olefins and aromatic compounds with sulfur trioxide at about —40° to 100° C., the improvement which comprises using sulfur trioxide in the form of a complex comprising sulfur trioxide and a trialkyl phosphite, wherein the mole ratio of said trialkyl phosphite to sulfur trioxide in the complex is about 1:1 to 7 and at least some of the complexed sulfur trioxide is capable of sulfonating said unsaturated compound.

References Cited in the file of this patent

UNITED STATES PATENTS

| | | |
|---|---|---|
| 2,644,801 | D'Alelio | July 7, 1953 |
| 2,694,086 | Mitchell et al. | Nov. 9, 1954 |
| 2,764,563 | McMaster et al. | Sept. 25, 1956 |